No. 770,320. PATENTED SEPT. 20, 1904.
C. P. E. SCHNEIDER.
LOADING APPLIANCE FOR GUNS.
APPLICATION FILED APR. 30, 1903.
NO MODEL. 10 SHEETS—SHEET 1.

Witnesses:
Wm. B. Kerkam
Gustave R. Thompson

Inventor:
Charles P. E. Schneider,
by Mauro, Cameron Lewis.
attys.

No. 770,320. PATENTED SEPT. 20, 1904.
C. P. E. SCHNEIDER.
LOADING APPLIANCE FOR GUNS.
APPLICATION FILED APR. 30, 1903.
NO MODEL. 10 SHEETS—SHEET 2.

No. 770,320. PATENTED SEPT. 20, 1904.
C. P. E. SCHNEIDER.
LOADING APPLIANCE FOR GUNS.
APPLICATION FILED APR. 30, 1903.
NO MODEL. 10 SHEETS—SHEET 3.

No. 770,320. PATENTED SEPT. 20, 1904.
C. P. E. SCHNEIDER.
LOADING APPLIANCE FOR GUNS.
APPLICATION FILED APR. 30, 1903.
NO MODEL. 10 SHEETS—SHEET 4.

No. 770,320. PATENTED SEPT. 20, 1904.
C. P. E. SCHNEIDER.
LOADING APPLIANCE FOR GUNS.
APPLICATION FILED APR. 30, 1903.
NO MODEL. 10 SHEETS—SHEET 5.

No. 770,320. PATENTED SEPT. 20, 1904.
C. P. E. SCHNEIDER.
LOADING APPLIANCE FOR GUNS.
APPLICATION FILED APR. 30, 1903.
NO MODEL. 10 SHEETS—SHEET 6.

No. 770,320. PATENTED SEPT. 20, 1904.
C. P. E. SCHNEIDER.
LOADING APPLIANCE FOR GUNS.
APPLICATION FILED APR. 30, 1903.
NO MODEL. 10 SHEETS—SHEET 8.

No. 770,320. PATENTED SEPT. 20, 1904.
C. P. E. SCHNEIDER.
LOADING APPLIANCE FOR GUNS.
APPLICATION FILED APR. 30, 1903.
NO MODEL.
10 SHEETS—SHEET 10.

No. 770,320. Patented September 20, 1904.

UNITED STATES PATENT OFFICE.

CHARLES PROSPER EUGENE SCHNEIDER, OF LE CREUSOT, FRANCE.

LOADING APPLIANCE FOR GUNS.

SPECIFICATION forming part of Letters Patent No. 770,320, dated September 20, 1904.

Application filed April 30, 1903. Serial No. 155,082. (No model.)

*To all whom it may concern:*

Be it known that I, CHARLES PROSPER EUGENE SCHNEIDER, of Le Creusot, Saône-et-Loire, in the Republic of France, have invented certain new and useful Improvements in and Relating to Loading Appliances for Guns; and I do hereby declare the following to be a full, clear, and exact description of the invention, such as will enable others skilled in the art to which it appertains to make and use the same.

This invention relates to a device suitable for ordnance of all kinds and in which the recoil of the gun is utilized not only for returning the gun to battery, but also for automatically effecting the following operations: first, opening the breech; second, bringing the charge or ammunition arranged upon a carrier to the rear of and in alinement with the gun without altering the position of the latter; third, introducing the complete charge of ammunition into the gun in a single operation; fourth, withdrawing the ammunition-carrier from the rear of the gun and conducting it to a predetermined waiting position; fifth, closing the breech; sixth, maintaining all the parts in their respective positions whatever may be the angle at which the gun is trained or the successive inclinations assumed by the platform.

Two constructional forms of this device applied to two different types of breech are hereinafter described.

The device being applicable to gun-breeches of all types, I have chosen as the two constructional forms (given by way of example, as above mentioned) types of breech to which all those at present known may be assimilated. First, the type of breech with concentric fillets may be considered as a wedge closing device, the radius of which instead of being infinite will be very small; second, the type of screw-breech proceeding from all the models, with a block which is screw-threaded or provided with sectors, hollowed or not, cylindrical, stepped, or conical. The first constructional form therefore constitutes an automatic loading appliance which is operative in all positions of vertical and lateral pointing and which is intended for guns provided with concentric-fillet breeches.

In gun-carriages as hitherto constructed the loading of the gun is generally performed while this latter is in a predetermined position, which is approximately horizontal. The breech is then open. The ammunition is introduced into the bore either by hand or by means of a rammer, and the gun is then returned to the firing position after the breech has been closed.

The device represented in Figs. 1 to 19, inclusive, permits, as is hereinafter explained, of automatically effecting all the operations enumerated above in all the positions of pointing of the gun and even during sighting operations by the following means: The gun slides during recoil in a cradle movable around horizontal trunnions. It carries with it in its recoil movement two brake-cylinders, one of which is rigidly connected to the gun, while the other, rendered independent at a certain moment, is retained at the position of recoil while the gun returns to battery. The first-mentioned cylinder, rigidly connected to the gun, absorbs during the recoil a large part of the *vis viva* of the movable system and compresses in a reservoir air which in expanding will return the gun to battery immediately the recoil is finished. The second cylinder carries the rammer. It is rigid with the gun during the recoil only. The rammer-cylinder compresses also during the recoil air in a reservoir in such a manner as to store up the power necessary for inserting the ammunition into the gun. The breech is opened automatically at the commencement of the return of the gun to battery and closed also automatically, but only at the termination of the return of the rammer-cylinder. The system comprises the ammunition-carrier mounted upon two levers displaceable around vertical shafts and arranged upon the side of the cradle. The ammunition-carrier is acted upon by a spring which constantly tends to bring it behind the gun; but it can only assume this position when the gun has returned to battery. When the gun has completed its return to battery, the ammunition-carrier is brought by its spring behind the gun. At the termination of this movement the rammer-cylinder is released automatically and then in returning to battery introduces the ammunition into the bore. Safety mechanism insures efficient operation and prevents any premature operation of the different parts.

The gun $a$ recoils in guides fixed on a cradle $b$, formed by two parallel cheeks connected by means of cross-stays. Each cheek carries a hollow trunnion $c$, closed by a plug $d$, provided with an air-charging pipe. The trunnions $c$, independent of each other, constitute two air-recuperators. The right-hand trunnion communicates with the rod of the piston $p$ of the rammer-cylinder $q$, while the left-hand trunnion communicates with the rod $n$ of the brake-cylinder $m$. The brake-cylinder, Figs. 8, 8ª, is arranged beneath the gun and connected rigidly with it. It carries at its lower portion a stop 1, Figs. 7 and 9. The rammer-cylinder $q$, Fig. 6, is guided by a guideway 2, fixed upon the right-hand cheek. Said cylinder is caused to recoil by a heel 3, Fig. 2, against which strikes the rear face of the gun. At the end of the recoil the rammer-cylinder $q$ is retained by the spring-pawl $v$, Figs. 2, 3, and 5, fixed upon the cradle and engaging with the rack $u$, carried by the said cylinder $q$, Fig. 2. The rammer-cylinder $q$ carries at its rear lower portion another heel 4, having an inclined surface and a straight portion parallel with the axis of the gun. The piston-rods $p$ and $n$ of the brake-cylinder and the rammer-cylinder are fixed at the front and rear upon the cradle $b$. They communicate, by means of the conduits $t$ and $o$ and the pipes $r$ and $f$, with the hollow trunnions $c$ forming the aforesaid recuperators. The diameter of the rear portions of the rods $p$ and $n$ is greater than that of the front portions. The rammer $x$, Fig. 18, is pivoted on a shaft 5, carried by a support fixed upon the rammer-cylinder $q$. The said rammer is maintained parallel with the axis of the gun by a spring-pusher $e$, that bears upon the two projections $g$ and 6, carried by the rammer $x$, and said rammer is adapted to rock to the right and left of the median position, but always tends to resume this median position under the action of the pusher $e$.

The gun is furnished with a breech-block having concentric fillets $h$, which block turns around a vertical shaft $i$, the lower portion of which carries a stop $k$ and a spring-roller $l$, Figs. 12 to 17. This roller is movable vertically with its shaft in a recess formed in the shaft $i$ of the breech-block. The operating-guide 7 for the breech-block is fixed upon the cradle $b$ and is provided in front with an inclined surface 8, Fig. 14, and at the rear with two other inclined surfaces 9 and 10, Fig. 13.

The ammunition-carrier 11 is mounted upon two levers 12 and 13, movable around vertical shafts carried by the supports 14 and 15, fixed upon the sides of the cradle $b$. The lever 13 is connected to the ammunition-carrier by a spring shaft or bolt 16, Fig. 19, which at the proper time prevents any rotary movement of the lever. A spring 17, one extremity of which is fixed to the cradle and the other to the lever 12, constantly tends to bring the ammunition-carrier behind the gun. Upon the same shaft that carries the lever 13 and at the lower portion thereof is keyed a short lever 18, which actuates a rod 19, sliding transversely in the cradle. The rod 19 carries two rollers 20 and 21, which respectively come into contact with the stop 1 and the heel 4, carried by the cylinders.

Figure 1:
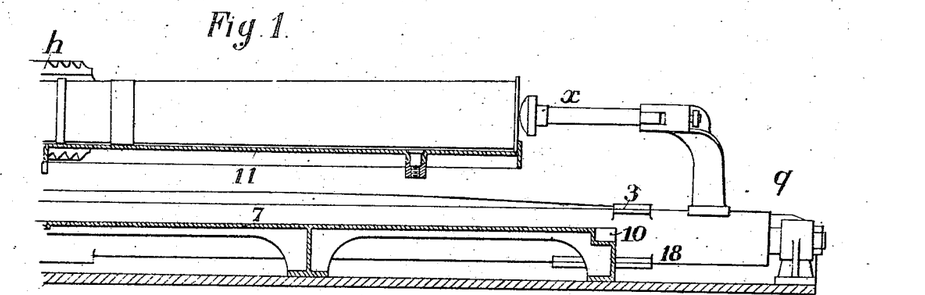
Figures 1, 1$^a$ are longitudinal sections showing the gun returned to battery, the rammer withdrawn, and the ammunition-carrier lying axially with respect to the gun.
Figure 1A:
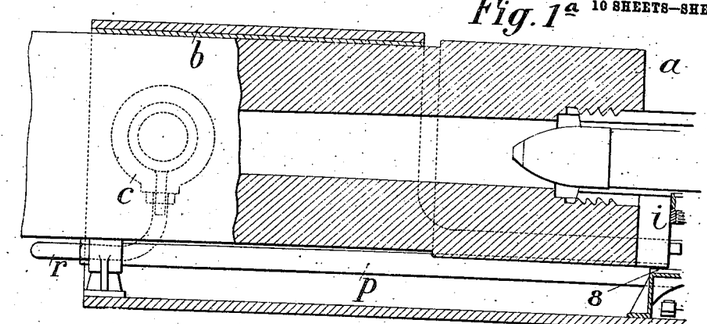
Figure 2:
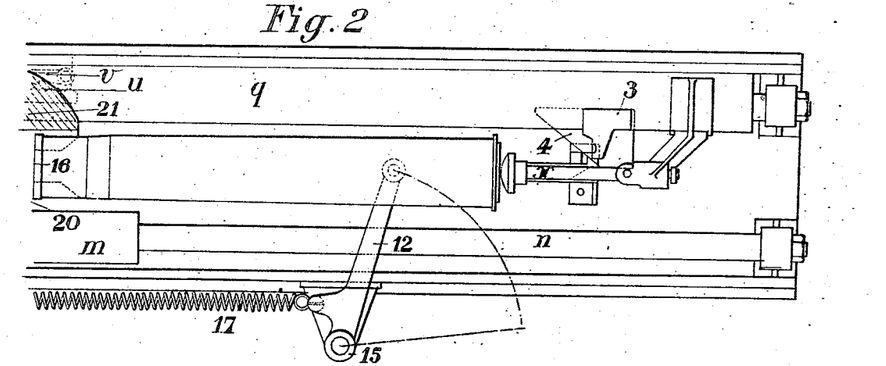
Figs. 2, 2$^a$ are plans corresponding to Fig. 1.
Figure 2A:
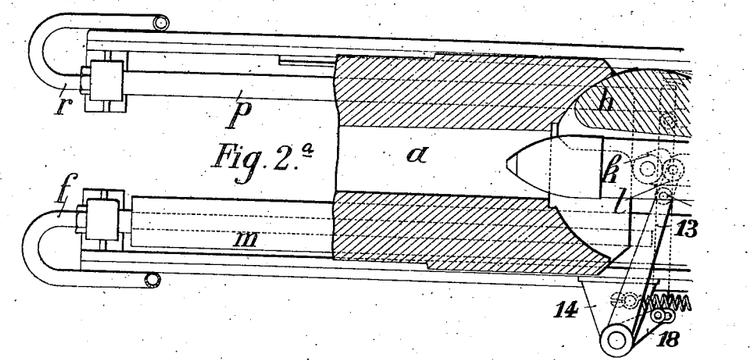
Figure 3:
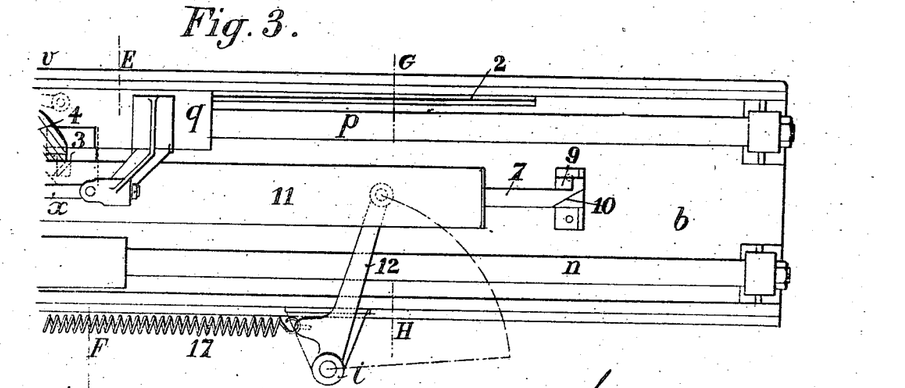
Figs. 3, 3$^a$ are plans showing the gun in battery and the rammer-cylinder at the end of its advance movement.
Figure 3A:
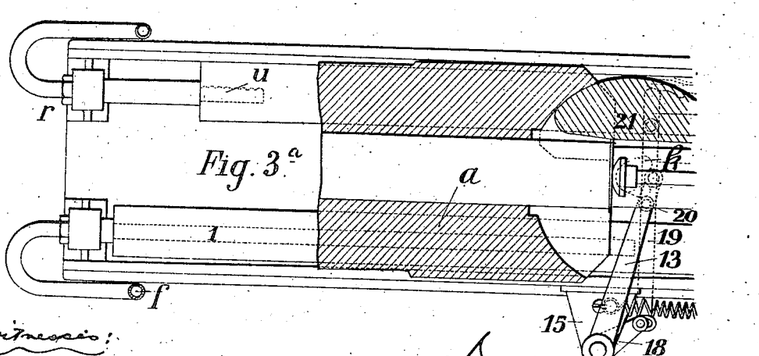
Figure 4:
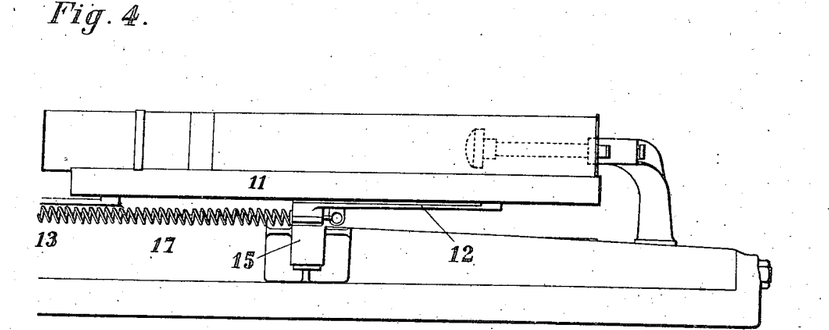
Figs. 4, 4$^a$ are elevations showing the gun in battery and the rammer-cylinder at the recoil.
Figure 5:
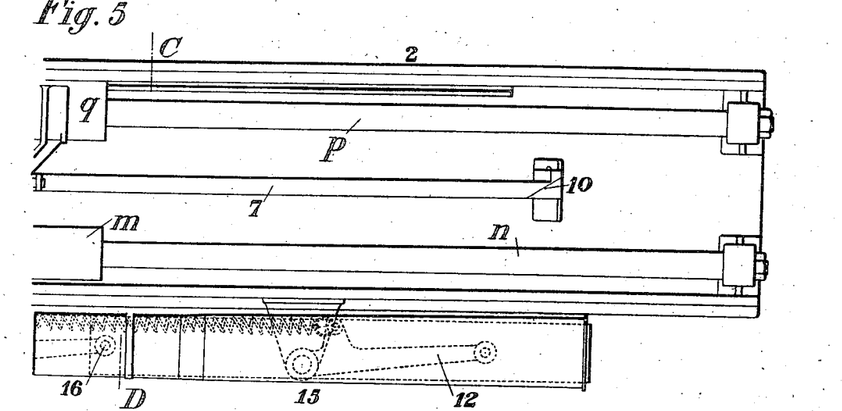
Figs. 5, 5$^a$ are plans showing the gun ready for firing.
Figures 6, 9, 13, 17, 18, 19:
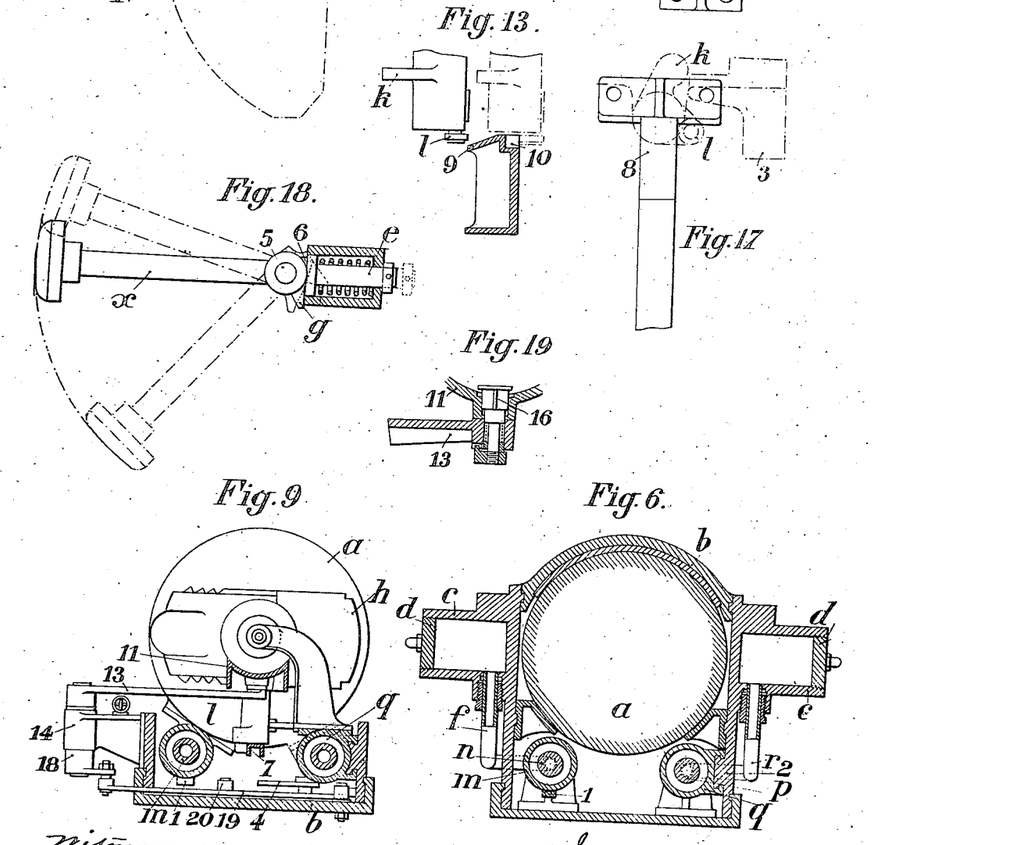
Fig. 6 is a cross-section through the axis of the trunnions on the line A B of Fig. 4.
Fig. 9 is a cross-section on the line E F of Fig. 3.
Fig. 13 is a section on the line O P of Fig. 12.
Fig. 17 is a plan of the front of the guide for the breech-lever, showing the closed breech in broken lines.
Fig. 18 is a detail view of the rammer.
Fig. 19 is a vertical section showing the bolt of the ammunition-carrier and its support.
Figure 7:
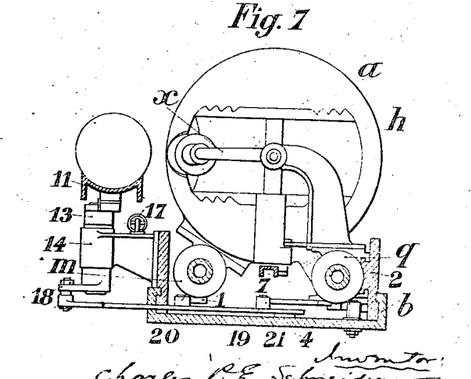
Fig. 7 is a rear view of the gun-carriage with the parts in position for firing, said view being partly in section on the line C D of Fig. 5.
Figure 8:
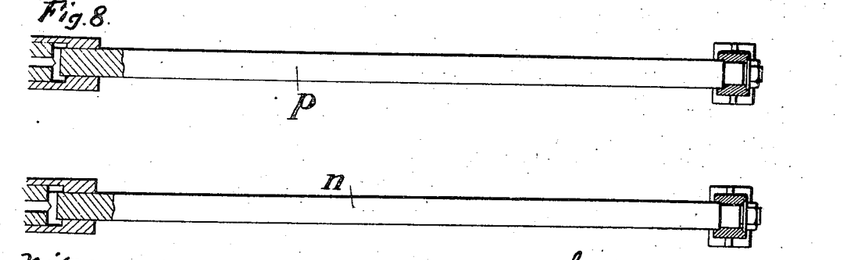
Figs. 8, 8$^a$ are horizontal sections through the axis of the recoil-cylinders.
Figure 10:
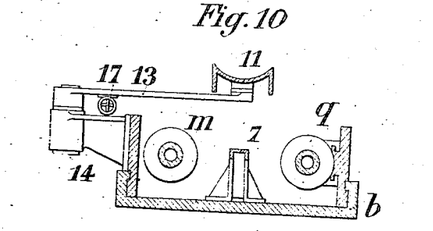
Fig. 10 is a cross-section on the line G H of Fig. 3.
Figure 11:
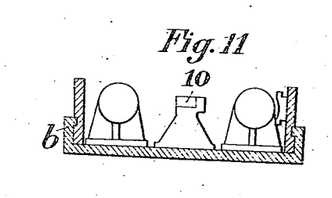
Fig. 11 is a rear view showing the attachment of the piston-rods and the guide for the breech-lever hereinafter described.

Assuming that the gun is ready for firing and that the parts occupy the position represented in Figs. 5, 5ª, then at the moment of firing the gun recoils, carrying with it the cylinders $m$ and $q$ and forcing into the recuperators $c$ a certain quantity of liquid owing to the differences of diameter between the front and rear portions of the rods $p$ and $n$. During the recoil movement the spring-roller $l$ travels upon the straight side of the guide 7 and maintains the breech closed. At the end of the recoil the roller $l$ is lifted by the inclined surface 9 and leaves the guide. At this moment the breech will be closed, but afterward opened by the guide 10.

Figure 12:
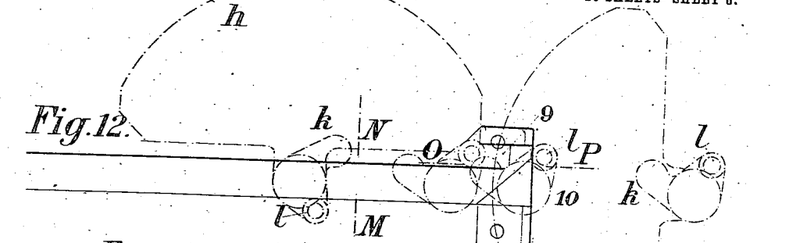
Figs. 12, 12$^a$ are plans of the said guide on a larger scale.
Figure 12A:
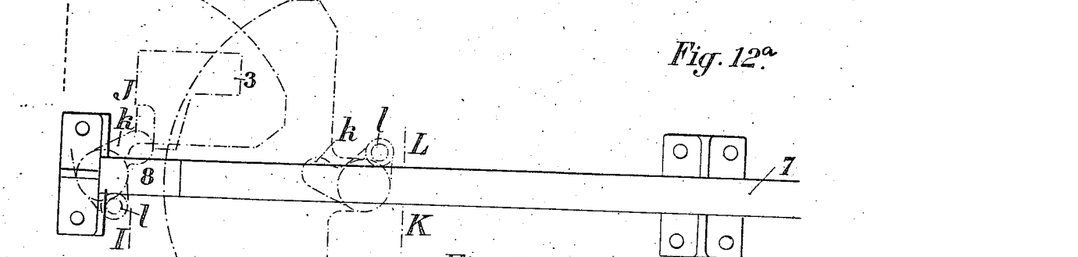
Figure 14:
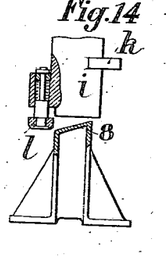
Fig. 14 is a section on the line I J of Fig. 12$^a$.
Figure 15:
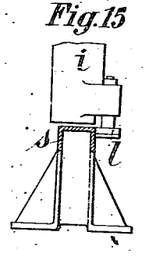
Fig. 15 is a section on the line K L of Fig. 12$^a$.
Figure 16:
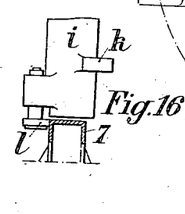
Fig. 16 is a section on the line M N of Fig. 12.
Figure 20:
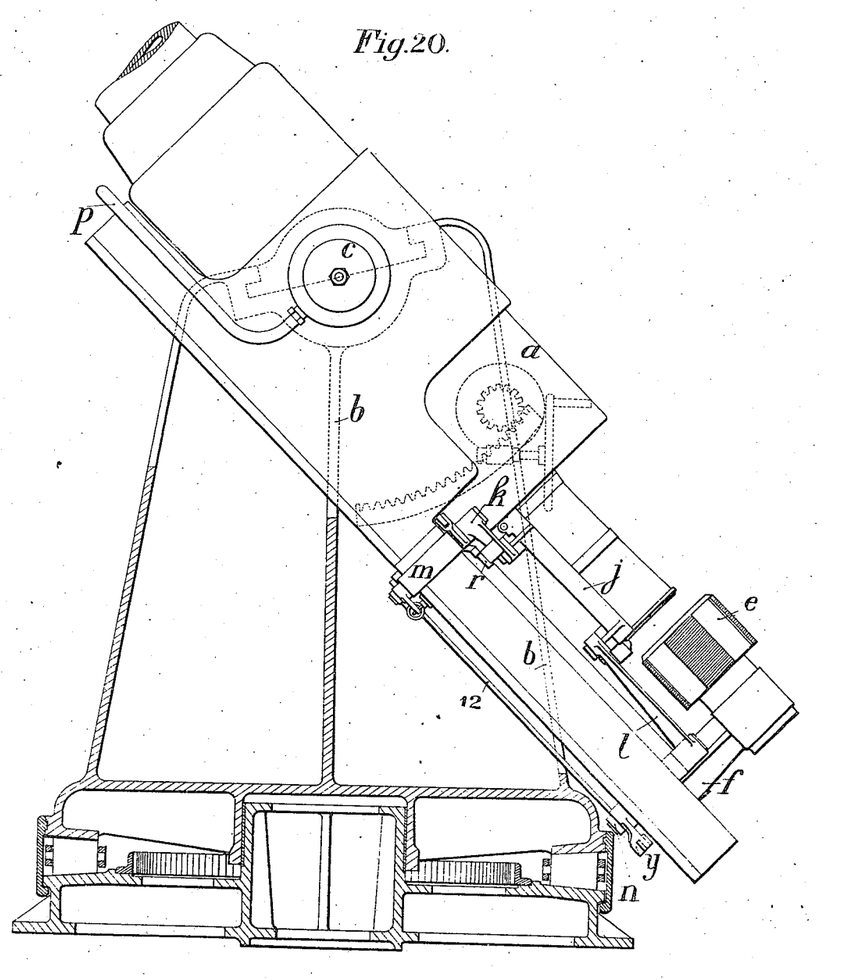
Fig. 20 is a general view showing the gun-carriage mounted upon a howitzer-frame and placed in the position of maximum elevation.
Figure 21:
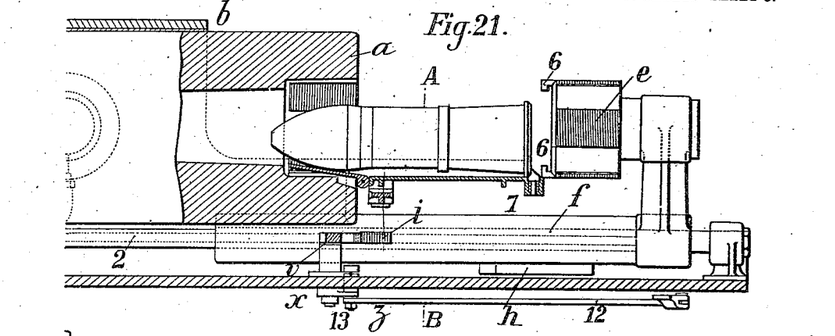
Figs. 21, 21$^a$ are longitudinal sections through the gun-carriage with the gun and brake cylinder returned to battery, the breech-cylinder being in the position of recoil and the ammunition-carrier behind the gun.
Figure 21A:
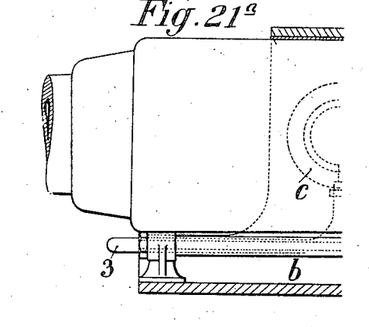

Figs. 12, 12ª show in broken lines the breech-block in the different positions which it may assume successively during the recoil of the gun and its return to battery.

During the whole of the recoil the ammunition-carrier 11 is maintained at the side of the cradle $b$ by the rollers 20 and 21 and the rod 19, which prevent any movement of this rod, and consequently of the carrier, owing to the successive contact of the roller 21 upon the straight portion of the heel 4 during the first part of the recoil and of the roller 20 upon the stop 1 during the last part. The recoil having finished, the rammer-cylinder $q$ is engaged by the spring-pawl $v$, which engages with the teeth of the rack $u$. The rammer-cylinder is then maintained at the recoil.

Under the influence of the air compressed in the left-hand trunnion the brake-cylinder is returned to battery, carrying with it the gun and the breech. At the commencement of this movement the spring-roller $l$ of the breech-block shaft $i$ encounters the inclined surface 10 upon the rear of the guide 7, as indicated in broken lines in Fig. 13. The movement of translation of the gun causes the roller $l$ to pass to the left-hand side of the guide 7, thus effecting the opening of the breech, as indicated in broken lines of Fig. 12.

Throughout the whole duration of the return to battery of the gun the roller $l$ is in contact with the left-hand side of the guide. Consequently during the return to battery the breech cannot be closed.

The rammer, which is maintained in an inclined position at the left hand by the breech during the recoil, resumes its median position under the action of the spring-pusher $e$ at the commencement of the return of the gun to battery.

The ammunition-carrier 11 is still maintained at the side of the cradle $b$ during the greater portion of the return travel of the gun to battery by the roller 20 and the stop 1.

Upon the termination of the return of the gun to battery, the roller 20 being no longer in contact with the stop 1, the carrier 11, actuated by the spring 17, is brought into a position behind the gun. Nevertheless this movement can only take place if the ammunition is placed upon the said carrier. Should the carrier be empty, the shaft 16 of the lever 13 locks, under the action of its spring, the said lever and the carrier 11 and prevents any movement of rotation thereof. (See Fig. 19.)

When the ammunition is in position on the carrier, the shaft 16 is depressed by the weight of the ammunition, and the carrier is able to move under the action of the spring 17 and come behind the gun.

While the carrier is moving into position behind the gun the ammunition comes into contact laterally with the rammer $x$ and causes it to rock toward the right until the ammunition lies axially with respect to the gun and is partly introduced into the bore. At this moment and under the action of the spring-pusher $e$ the rammer is returned to its median position—that is to say, axially with respect to the gun.

The rod 19, connected to the ammunition-carrier by the levers 18 and 13, becomes displaced to the right simultaneously with the movement of the carrier. At the end of its travel the rod 19 bears upon the spring-pawl $v$ and releases it from the rack $u$. At this moment the rammer-cylinder $q$, being no longer maintained, returns to battery under the action of the compressed air contained in the right-hand trunnion. During this movement the ammunition acted upon by the rammer $x$ is introduced into the gun. Toward the end of the return of the rammer-cylinder $q$ to battery the inclined portion of the heel 4, carried by the said cylinder, encounters the roller 21 of the rod 19 and causes the latter to move toward the left, and consequently returns the carrier to the side of the cradle, placing the spring 17 in tension. In completing its return movement to battery the rammer-cylinder $q$ brings the heel 3 into contact with the stop $k$ of the shaft $i$ of the breech-block and effects the closing thereof. During this movement the roller $l$ passes from the right side of the guide, traversing the inclined plane 8, Fig. 14, and the rammer is displaced to the left by the breech-block. The gun is then again ready for firing, the breech is maintained closed, and the carrier is retained at the side of the cradle ready for the reception of a fresh charge.

The drawings show only the gun, its sleeve, and the loading mechanism. The whole thus constituted may be mounted indifferently upon land or sea gun carriages or mountings, whatever the special arrangement of the rotating platform of the said carriages or mountings may be.

Figs. 20 to 29 represent a second constructional form of the invention constituting an automatic loading appliance for all positions of pointing, whether vertical or lateral, for guns provided with screw-breeches. In this arrangement the gun recoils in a cradle which is movable about trunnions and carries two brake-cylinders, one rigidly fixed to the gun and the other capable of being rendered independent of it at a given moment and of remaining at the recoil while the gun returns to battery. This latter cylinder carries and operates the breech-screw and is for this reason called the "breech-cylinder." An ammunition-carrier, mounted upon two levers movable about vertical shafts, is placed at the side of the cradle. Under the action of a spring said carrier comes behind the gun when the latter returns to battery. As the ammunition-carrier reaches the loading position it releases the breech-cylinder from the device by which it is maintained at the recoil. The breech-screw, arranged behind the ammunition, carries the latter forward with it, introduces it into the gun, and causes the carrier to move aside at the end of the forward movement of the breech-cylinder. The breech then closes automatically. Safety appliances insure efficient operation of the mechanism.

Figure 22:
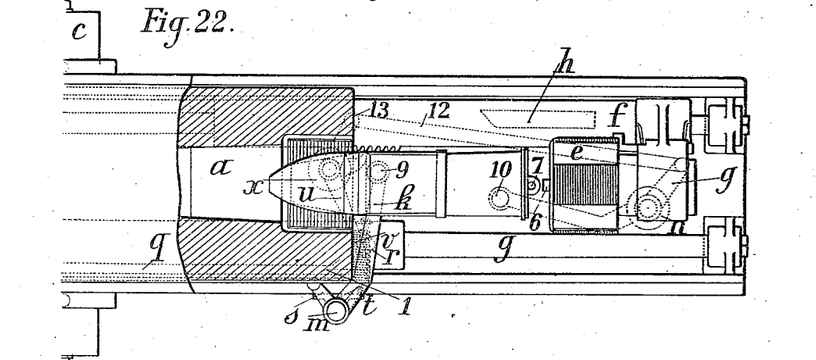
Figs. 22, 22$^a$ are plans corresponding to Figs. 21, 21$^a$.
Figure 22A:
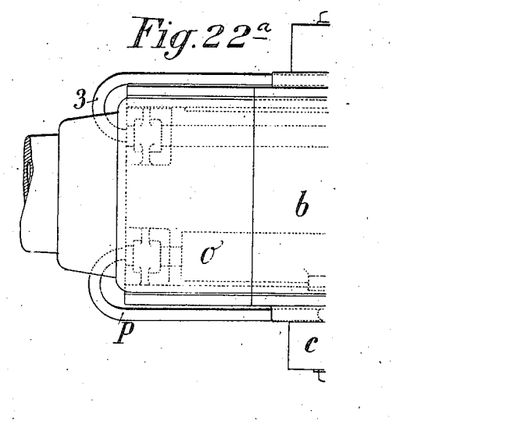
Figure 23:
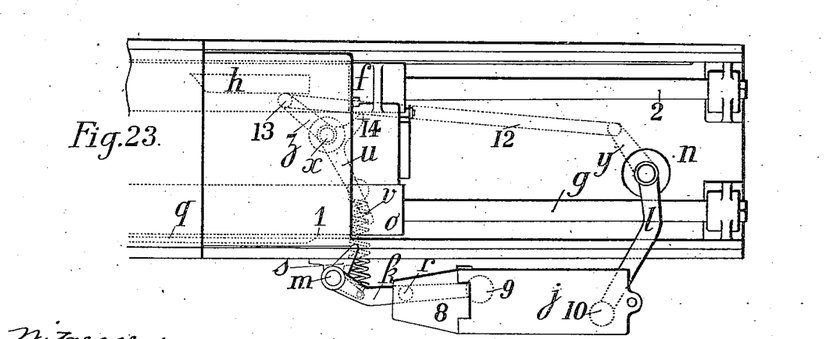
Fig. 23 represents a plan of the gun ready for firing, with the carrier moved aside.

The gun $a$ recoils in guides on a cradle $b$, formed by two parallel cheeks connected by two cross-stays. Each cheek carries a hollow trunnion $c$, closed by a plug $d$, provided with an air-charging pipe. The two trunnions, which are completely independent, serve as recuperators. The right-hand trunnion insures the return to battery of the breech-cylinder, while the left-hand trunnion effects the return to battery of the gun and the brake-cylinder $o$. The said brake-cylinder $o$ is placed beneath the gun at the left-hand side and is fixed rigidly thereto. The piston-rod $g$, Figs. 22 and 23, is fixed and maintained in two supports arranged one in front of the other at the rear of the cradle. The diameter of the rear portion is greater than the diameter of the front portion. The conduit $d'$, formed in the front portion of the rod $g$, leads to the rear of the piston. A pipe $p$ places the left-hand trunnion in communication with this piston-rod. At the recoil, owing to the difference of diameters of the front and rear parts of rod $g$, a certain quantity of liquid is forced into the trunnion and compresses the air. At one side of the brake-cylinder $o$ is a rib $q$, having its rear end formed with a circular chamfer 1, Figs. 22, 23, and 24.

The breech-cylinder $f$, arranged below the right-hand side of the gun, is movable with the said gun during recoil only. The piston-rod 2 is similar to the rod $g$ and communicates with the right-hand trunnion by means of the pipe 3. A heel $h$, Figs. 22 to 25, having an inclined front end, is provided on the breech-cylinder $f$, which is furnished with a rack $i$ and is guided in its recoil movement by a guideway formed in the right-hand cheek of the cradle. The breech-screw $e$ is supported by an arm arranged at the rear of the breech-cylinder. The said breech-screw terminates in a quick-threaded screw 4, Fig. 28, engaging with a nut formed upon the arm. A spring tappet or bolt 5, housed in the nut, is adapted to engage with the breech-screw and prevent its rotation at the proper times. Screw-threaded segments on the breech-screw permit of its being locked to the breech-chamber of the gun. Two extractors 6 engage with the base of the cartridge-case when the gun returns to battery and extract said case out of the gun, so that it may be removed by hand.

The ammunition rests upon the carrier $j$, which is provided at the rear with a retaining-bolt 7 and in front with a shot-guide 8, which is movable about a horizontal shaft and serves to protect the screw-threads of the breech. Two levers $k$ and $l$, displaceable, respectively, around fixed shafts $m$ and $n$, support the carrier by their articulated extremities 9 and 10. The articulation of the lever $k$ is locked by a spring-bolt 11, Fig. 29, which is liberated only when the ammunition is upon the carrier. The latter can therefore only come behind the gun when it is provided with ammunition. The said lever $k$ is keyed upon a supporting-shaft $m$. It carries at its lower portion and approximately midway of its length a horizontal roller $r$, which actuates one of the arms of a double lever $u$, movable about a fixed support $x$. The other arm of the double lever is in the form of a pawl 14 and is capable of engaging with the teeth of the rack $i$ under the action of a torsion-spring arranged in the support $x$. Upon the shaft carrying the lever $k$ are also keyed two short levers $s$ and $t$. The lever $s$ is provided with a roller situated in the same plane as the rib $q$. The other lever, $t$, is actuated by a spring $v$, which constantly tends to bring the lever $k$, and consequently the ammunition-carrier $j$, behind the gun.

The lever $l$ is keyed upon the shaft of the fixed support $n$. At the lower portion of this shaft and also keyed upon it is a short arm $y$, connected to a parallel arm $z$ by means of a connecting-rod 12, placed beneath the cradle. The arm $z$ is loose upon the shaft of the support $x$ and entirely independent of the double lever $u$. It carries at its extremity a roller 13, situated in the same plane as the heel $h$.

Figure 24:
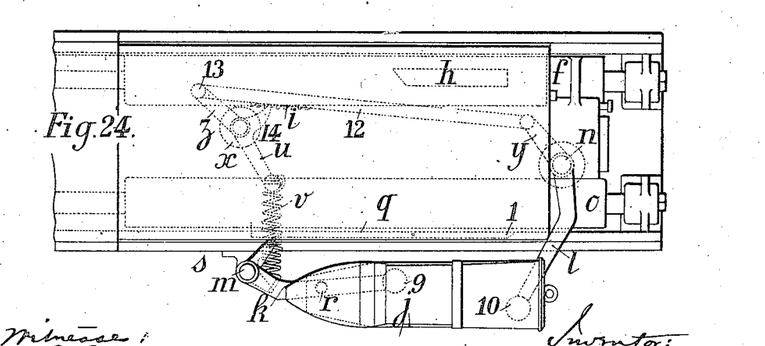
Fig. 24 represents the gun in the position of recoil, with the breech closed.
Figure 25:
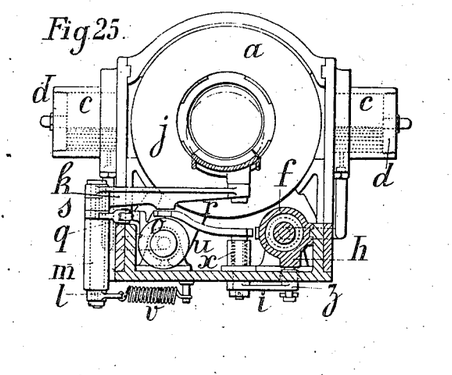
Fig. 25 is a cross-section on the line A B of Fig. 21.
Figure 26:
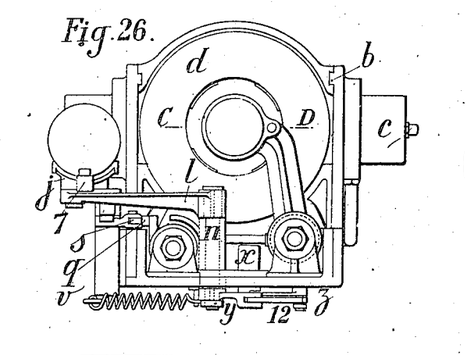
Fig. 26 is a rear view of the gun-carriage corresponding to Figs. 23 and 24.
Figure 27:
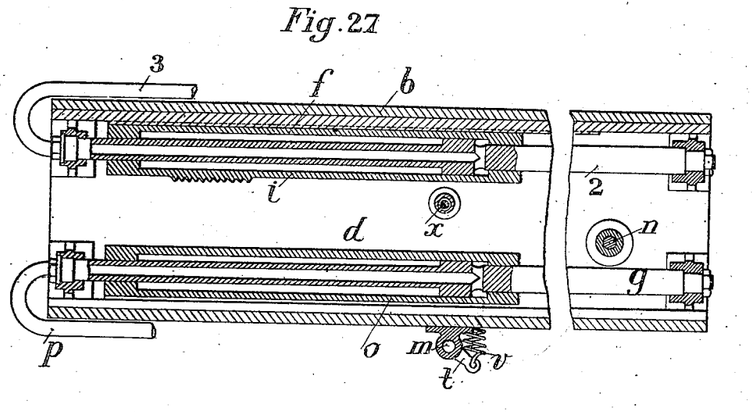
Fig. 27 is a horizontal section through the axis of the brake-cylinders.
Figure 28:
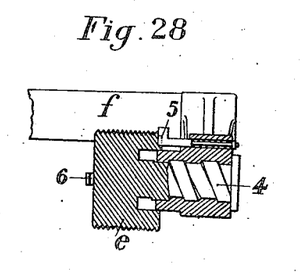
Fig. 28 is a horizontal section of the breech-screw on the line C D of Fig. 26.
Figure 29:
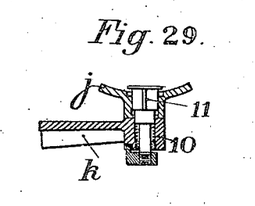
Fig. 29 is a vertical section through the axis of the lever $k$, supporting the ammunition-carrier.

Assuming the parts to occupy the position represented in Fig. 23 and the gun ready for firing, then when the gun is fired it recoils, carrying with it the cylinders $o$ and $f$. The roller 13, bearing against the heel $h$, maintains the rigidly-connected levers $y$ and $l$ in the position indicated in this figure and locks the ammunition-carrier $j$. Any movement of the latter is rendered impossible during the recoil by the fact that the heel $h$ and the rib $q$ are arranged in such a manner that the roller of the lever $s$ comes into contact with the rib $q$ before the roller 13 has left the heel $h$. At the end of the recoil the pawl 14 of the double lever $u$, actuated by its torsion-spring, engages with the teeth of the rack $i$ and locks the breech-cylinder $f$. Fig. 24 shows the position of the parts at this time. Under the influence of the compressed air in the left-hand trunnion the brake-cylinder $o$ returns to battery with the gun, while the breech-cylinder $f$ is locked by the pawl 14. The breech-screw $e$ is angularly displaced by means of its rear screw-threaded portion 4, and thereby disengaged from the screw-threaded segments of the gun. The nut formed in the arm of the breech-cylinder being fixed, the rear screw 4 is caused to rotate. This rotation angularly displaces the breech-screw $e$ and causes it to bring its screw-threaded segments in the spaces between the screw-threaded segments of the gun. At this moment the gun continues its travel alone without the breech-screw. The rotation of the breech-screw brings the recess formed therein opposite the bolt 5, Fig. 28, which then enters the said recess and prevents the breech-screw from rotating. During the first portion of the return to battery of the brake-cylinder $o$ the rib $q$ locks the lever $s$ until the circular chamfer 1 comes opposite the roller of the lever $s$, which at this moment becomes free. The spring $v$ actuates the lever $t$, which displaces the lever $k$, and the ammunition-carrier $j$ moves into position behind the gun. At the end of this movement the roller $r$ operates the double lever $u$, releases the pawl 14, and permits the cylinder $f$ to return to battery under the influence of the compressed air in the right-hand trunnion. This return to battery can therefore only take place if the ammunition-carrier is in the loading position. Fig. 22 indicates the position of the parts at this time. The breech-screw $e$ in its forward movement disengages the retaining-bolt 7, pushes the base of the cartridge-case in a forward direction, and introduces the latter into the gun. At the end of this movement the front inclined surface of the heel $h$ strikes the roller 13 of the lever $z$, which displaces the connecting-rod 12 and the levers $y$ and $l$ and returns to one side the ammunition-carrier $j$, which remains locked by the roller 13 bearing against the heel $h$. The breech-screw enters the breech-chamber of the gun, with its threaded segments in the spaces between the threaded segments of said breech-chamber, and is arrested by the base of the cartridge-case, which has reached its firing position. The bolt 5, bearing against the rear face of the gun, releases the breech-screw $e$ and renders the latter capable of turning. The breech-screw $e$ being thus arrested, the breech-cylinder continues its movement for a short distance. The nut of the screw 4 not being able to rotate turns and causes the breech-screw to engage with the threads of the breech-chamber. The parts thus assume the position shown in Fig. 23, and the gun is then ready for firing.

What I claim, and desire to secure by Letters Patent of the United States, is—

1. In a gun-loading apparatus, the combination of a gun and its carriage, with two brake-cylinders one of which is connected to the gun and returns the same to battery after recoil, and the other of which reciprocates on the carriage independent of the gun, ammunition-advancing means actuated by said last-named cylinder and releasing means for said cylinder restrained by the first-named cylinder while the gun returns to battery.

2. In a gun-loading apparatus, the combination of a gun, two brake-cylinders moving rearward with the gun, power-storing means connected to said cylinders, connections between one of said cylinders and the gun whereby the latter is returned to battery, ammunition-advancing means operatively connected to the other cylinder, and releasing means for the latter cylinder restrained by the first brake-cylinder while the gun returns to battery.

3. The combination of a gun, a carriage therefor, a recoil-cylinder carried by the gun, a second recoil-cylinder carried by and reciprocating on the carriage, power-storing means connected to said cylinders, an engagement between said gun and second cylinder, whereby the cylinder is moved rearward by the gun on its recoil, means retaining said cylinder in its rearward position when the gun returns to battery, means actuated by the second cylinder to advance ammunition into the gun and releasing means for said second cylinder restrained by the first cylinder while the gun returns to battery.

4. In a gun-loading apparatus, the combination of a gun and its carriage, with two brake-cylinders one of which is connected to the gun and returns the same to battery after recoil, and the other of which reciprocates on the carriage independent of the gun, an ammunition-carrier movable into and out of position behind the gun, ammunition-advancing means actuated by the last-named cylinder, and releasing means for the latter cylinder restrained by the first-named cylinder while the gun returns to battery.

5. In a gun-loading apparatus, the combination of a gun, two brake-cylinders moving rearward with the gun, power-storing means connected to said cylinders, connections between one of said cylinders and the gun, whereby the latter is returned to battery, an ammunition-carrier movable into and out of position behind the gun, ammunition-advancing means connected to the other cylinder, a device normally retaining said last-named cylinder in its rearward position, and releasing means for said device engaging said first cylinder and actuated by the ammunition-carrier as it moves into position behind the gun.

6. The combination of a gun, and its breech-block, with two brake-cylinders moving rearwardly with the gun one of which is connected to the gun and returns it to battery, automatic breech-block-opening devices operating as the gun returns to battery, a second brake-cylinder moving forward after the gun is in battery, and ammunition-advancing means and breech-block-locking devices both operated by said last-named cylinder.

7. In a gun-loading apparatus, the combination of the gun, two brake-cylinders resisting the recoil of the gun, separate power-storing means connected to each cylinder, devices for advancing ammunition into the gun, connections between one of said cylinders and the gun whereby the gun is returned to battery, connections between the other cylinder and the ammunition-advancing devices, and releasing means for the second-named cylinder restrained by the first cylinder while the gun returns to battery.

8. In a gun-loading apparatus, the combination of the gun, two brake-cylinders resisting the recoil of the gun, separate power-storing means connected to each cylinder, an ammunition-carrier automatically movable into position behind the gun, retaining devices one of which is released by the weight of the charge and normally holding the carrier at one side of the gun-breech, and the other carried by a brake-cylinder and holding the carrier at one side during recoil and return devices for advancing ammunition into the gun, connections between one of said cylinders and the gun whereby the gun is returned to battery, and connections between the other cylinder and the ammunition-advancing devices whereby the gun is loaded.

9. In a gun-loading apparatus, the combination of a gun and its carriage, a brake-cylinder fast to the gun for returning the same to battery, a rammer-cylinder detachably connected to the gun and moving with the same during recoil, means for retaining the rammer-cylinder in its rearward position when the gun returns to battery, a rammer carried by said rammer-cylinder, a spring-actuated ammunition-carrier normally tending to an axial position in rear of the gun, a stop on the brake-cylinder for restraining the movement of the carrier during recoil and return to battery, means actuated by the carrier for releasing the rammer-cylinder after return of the gun to battery, and means actuated by the rammer-cylinder for returning the carrier to a position at the side and rear of the gun.

10. In a gun-loading apparatus, the combination of a gun and its carriage, a brake-cylinder fast to the gun for returning the same to battery, a rammer-cylinder detachably connected to the gun and moving with the same during recoil, means for retaining the rammer-cylinder in its rearward position when the gun returns to battery, automatic breech-plug-withdrawing means operative when the gun is at the end of its recoil, means restrained by the brake-cylinder while the gun returns to battery for releasing the rammer-cylinder, means for locking the breech-plug, and means on the rammer-cylinder for actuating said locking means.

11. In a gun-loading apparatus, the combination of a gun and its carriage, a brake-cylinder fast to the gun for returning the same to battery, a rammer-cylinder detachably connected with the gun and moving with the gun during recoil, means for retaining the rammer-cylinder in its rearward position when the gun returns to battery, a rammer carried by said rammer-cylinder, a spring-actuated ammunition-carrier normally tending to a position in rear of the gun, a stop on the brake-cylinder for restraining the movement of the carrier during recoil and return to battery, and means actuated by the carrier for releasing the rammer-cylinder whereby the rammer advances the ammunition into the gun.

12. In a gun-loading apparatus, the combination of a gun and its carriage, a brake-cylinder attached to the gun and movable with it to return the same to battery, an ammunition-carrier, pivotally-supported arms for the same, a spring normally tending to move the carrier into an axial line behind the gun, a rod connected to one of the supporting-levers, and a stop on the brake-cylinder engaging said rod whereby the ammunition-carrier is retained in its position at the side and rear of the gun during recoil and return of the gun to battery.

13. In a gun-loading apparatus, the combination of a gun and its carriage, a brake-cylinder fast to the gun, a rammer-cylinder detachably connected to the gun and moving with the same during recoil, means for retaining the rammer-cylinder in its rearward position, an ammunition-carrier, levers suitably pivoted for supporting the said carrier, a spring normally tending to move said carrier into an axial line behind the gun, a stop on the brake-cylinder, for restraining the said spring during recoil and return of the gun to battery, a releasing-rod for the rammer-cylinder actuated by the ammunition-carrier and a cam projection on the rammer-cylinder for engaging said rod to return the said carrier to a position at the side and rear of the gun.

14. In a gun-loading apparatus, the combination of a gun and its carriage, a brake-cylinder attached to the gun and movable with it to return the same to battery, an ammunition-carrier, pivotally-supported arms for the same, a spring normally tending to move the carrier into an axial line behind the gun, a rod connected to one of the supporting-levers, a stop on the brake-cylinder engaging said rod to restrain said spring during recoil and return of the gun to battery, and a retaining device released by the weight of the charge and normally holding the carrier at one side of the gun-breech.

In witness whereof I have hereunto set my hand in presence of two witnesses.

CHARLES PROSPER EUGENE SCHNEIDER.

Witnesses:
 EDMOND BLAISE,
 JEAN GAMET.